(12) United States Patent
Cao et al.

(10) Patent No.: US 10,682,755 B2
(45) Date of Patent: Jun. 16, 2020

(54) ARM FOR MULTI-JOINT ROBOT, AND MULTI-JOINT ROBOT

(71) Applicant: ABB Schweiz AG, Baden (CH)

(72) Inventors: Xiaodong Cao, Shanghai (CN); Zhu Zhu, Shanghai (CN); Jiajie Sha, Shanghai (CN)

(73) Assignee: ABB Schweiz AG, Baden (CH)

( * ) Notice: Subject to any disclaimer, the term of this patent is extended or adjusted under 35 U.S.C. 154(b) by 175 days.

(21) Appl. No.: 15/975,006

(22) Filed: May 9, 2018

(65) Prior Publication Data

US 2018/0326574 A1    Nov. 15, 2018

(30) Foreign Application Priority Data

May 10, 2017   (CN) .......................... 2017 1 0328667

(51) Int. Cl.
*B25J 9/00* (2006.01)
*B25J 18/00* (2006.01)
*B25J 9/04* (2006.01)

(52) U.S. Cl.
CPC ............. *B25J 9/0009* (2013.01); *B25J 9/042* (2013.01); *B25J 18/00* (2013.01)

(58) Field of Classification Search
CPC .............................. B25J 9/0009; B25J 19/007
See application file for complete search history.

(56) References Cited

U.S. PATENT DOCUMENTS

| | | | | |
|---|---|---|---|---|
| 4,529,460 A * | 7/1985 | Hasegawa | ................ | B21J 13/10 156/253 |
| 5,934,147 A * | 8/1999 | Parker | .................... | E02F 3/384 414/695.5 |
| 6,279,413 B1 * | 8/2001 | Terada | ................ | B25J 19/0029 414/917 |
| 6,601,468 B2 * | 8/2003 | Grover | .................... | B25J 9/042 414/744.5 |
| 7,264,108 B2 * | 9/2007 | Borsarelli | .............. | B65G 47/82 198/429 |

(Continued)

FOREIGN PATENT DOCUMENTS

| CN | 106393091 A | 2/2017 |
|---|---|---|
| EP | 1880809 A1 | 1/2008 |
| JP | 07124887 A | 5/1995 |

OTHER PUBLICATIONS

Extended European Search Report, European Patent Application No. 18171266.2, dated Oct. 5, 2018, 10 pages.

*Primary Examiner* — William Kelleher
*Assistant Examiner* — Gregory T Prather
(74) *Attorney, Agent, or Firm* — Taft Stettinius & Holister LLP; J. Bruce Schelkopf

(57) ABSTRACT

The present disclosure provides an arm for a multi joint robot, and a multi joint robot. The arm is formed by a first half portion and a second half portion engaged with each other, an upper portion of each of the first and second half portions being provided with a protrusion, the protrusions being substantially parallel to each other, a lower portion of the first half portion being provided with a supporting member, the two half portions being engaged with each other via an engagement surface which is between the two protrusions, the shape of a lower portion of the second half portion matching the shape of an outer circumference of the supporting member.

20 Claims, 4 Drawing Sheets

(56) References Cited

U.S. PATENT DOCUMENTS

| | | | | |
|---|---|---|---|---|
| 8,453,533 | B2* | 6/2013 | Ryland | B08B 9/045 |
| | | | | 74/490.05 |
| 8,904,899 | B2* | 12/2014 | Bunsendal | B25J 9/0009 |
| | | | | 74/490.01 |
| 9,630,326 | B2* | 4/2017 | Rosheim | B25J 9/0045 |
| 9,742,250 | B2* | 8/2017 | Kremerman | H02K 5/128 |
| 10,183,403 | B2* | 1/2019 | Xiong | B25J 17/00 |
| 2014/0047940 | A1* | 2/2014 | Yamamoto | B25J 17/00 |
| | | | | 74/490.05 |
| 2019/0275685 | A1* | 9/2019 | Murakami | B25J 19/0029 |
| 2019/0308313 | A1* | 10/2019 | Lundback | F16H 57/02 |
| 2019/0315002 | A1* | 10/2019 | Haddadin | B25J 19/007 |

\* cited by examiner ously a variety of concrete policies will be made, which also leads to changes from one embodiment to another embodiment. In addition, it is to be understood that though efforts made during such development might be complicated and tedious, to those of ordinary skills in the art related to content disclosed by the present disclosure, some variations to design, manufacture or production as made on the basis of technical content disclosed in the present disclosure are merely conventional technical means, and content of the present disclosure should not be construed as being insufficient.

ARM FOR MULTI-JOINT ROBOT, AND MULTI-JOINT ROBOT

FIELD

The present disclosure relates to the technical field of robots, and more particularly, to an arm for a multi joint robot, and the multi joint robot.

BACKGROUND

As shown in FIG. 1, a multi joint robot 100 may comprise a first arm 101 and a second arm 102. An upper portion of the first arm 101 may be provided with two protrusions 105 and 106, which are substantially parallel to each other. A lower portion of the first arm may comprise a hollow supporting member 103, which may be used for carrying a device such as a motor or the like. The second arm 102 is rotatably connected to the two protrusions 105 and 106, so that the second arm 102 is supported by the two protrusions and is caused to rotate around an axis 0.

Usually the first arm may be cast using sand casting or pressure casting. Pressure casting is advantageous in dimension precision and stability and also has a low casting cost.

However, as shown in FIG. 2, regarding such a casting as the first arm 101 with an inward recess part 201, when the casting is completed, a casting mold 202 cannot be taken out. Moreover, in order to receive the robot's necessary components such as gears, synchronous belts and cables, the first arm 101 is usually designed into a hollow shape, and such a shape also prevents the mold 202 from being taken out when the casting is completed.

Due to the foregoing technical problems, sand casting is usually used in the prior art when making the robot's first arm 101. However, the first arm manufactured by sand casting is overweight and has a low dimension precision as well as high manufacturing expenses.

In order to use pressure casting, as shown in FIG. 7, the prior art further discloses that the first arm 101 is divided through a partitioning surface P1 into two half portions 701 and 702 which are die-cast separately, and then the two half portions are connected to obtain a complete first arm 101. However, in the prior art, the two half portions 701 and 702 are symmetrically shaped, and the supporting member at the bottom of the first arm is also divided into the two half portions. Thereby, when connecting the two half portions, the position needs to be adjusted in four directions, so that the precision of connection can hardly be guaranteed. In addition, dividing the supporting member may cause its mechanical performance to be affected.

SUMMARY

An objective of the present disclosure is to provide an arm for a multi joint robot and the multi joint robot, so as to solve the foregoing technical problems in the prior art.

One embodiment of the present disclosure provides an arm for a multi joint robot, the arm being formed by a first half portion and a second half portion engaged with each other, an upper portion of each of the first and second half portions being provided with a protrusion, the protrusions being substantially parallel to each other, a lower portion of the first half portion being provided with a supporting member, the two half portions being engaged with each other via an engagement surface which is between the two protrusions, a shape of a lower portion of the second half portion matching a shape of an outer circumference of the supporting member.

Another embodiment of the present disclosure provides a multi joint robot, comprising an arm for a multi joint robot according to the present disclosure.

The supporting member of the arm in the multi joint robot as provided by the present disclosure has better mechanical performance, and it is easier to hollowly process the arm.

DETAILED DESCRIPTION OF EMBODIMENTS

Description is presented below to specific embodiments of the present disclosure. It should be noted while describing these embodiments, the specification might not thoroughly describe all features of actual embodiments for the sake of brevity. It should be understood during actual implementation of any one embodiment, just as in the process of any one engineering project or design project, in order to achieve specific objectives of developers and satisfy system-related or business-related restrictions, usually a variety of concrete policies will be made, which also leads to changes from one embodiment to another embodiment. In addition, it is to be understood that though efforts made during such development might be complicated and tedious, to those of ordinary skills in the art related to content disclosed by the present disclosure, some variations to design, manufacture or production as made on the basis of technical content disclosed in the present disclosure are merely conventional technical means, and content of the present disclosure should not be construed as being insufficient.

Unless otherwise defined, technical or scientific terminology used in the claims and specification should be general meaning as interpreted by those of ordinary skills in the art. The words "first", "second" and the like are not to be read as any order, amount or importance but only are used to distinguish different components. The word "one" is not to be read as any amount restriction but is to be read as "at least one". The word "comprise" or "include" and the like means an element or article preceding "comprise" or "include" contains an element or article and equivalent elements as enumerated after "comprise" or "include", and does not exclude other element or article. The word "connect" or "link" and the like is neither limited to physical or mechanical connection nor limited to direct or indirect connection.

To make the objective, technical solution and advantages of the present disclosure clearer, the technical solution of the present disclosure will be clearly and completely described with reference to the specific embodiments and the accompanying drawings of the present disclosure. Obviously, the embodiments to be described are merely part of embodiments of the present disclosure, rather than all embodiments. Based on the embodiments of the present disclosure, all other embodiments as made by those of ordinary skills in the art without the exercise of any inventive skill should fall in the protection scope of the present disclosure.

Figure 1:
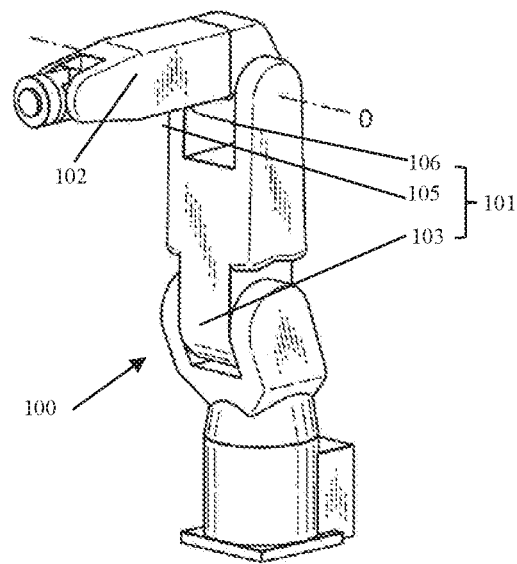
FIG. 1 shows a perspective view of an overall structure of a multi-joint robot.
Figure 2:
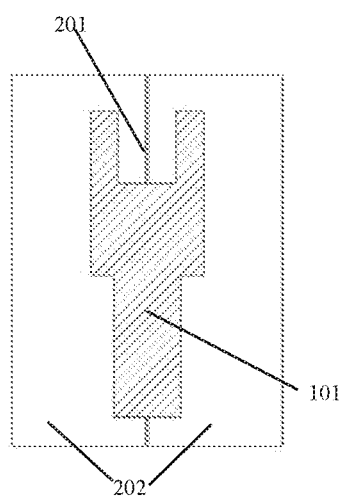
FIG. 2 shows a cross sectional view of a pressure casting mold for making a multi joint robot.
Figure 3:
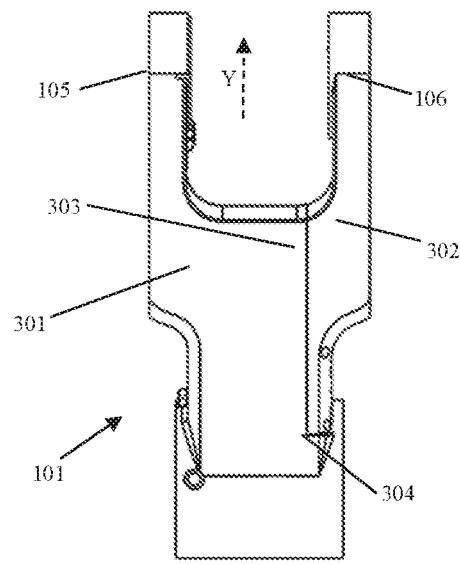
FIG. 3 shows a front view of an arm for a multi joint robot according to one embodiment of the present disclosure.
Figure 4:
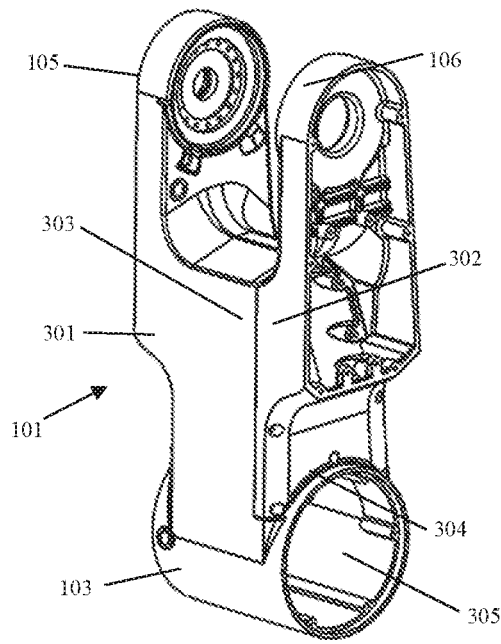
FIG. 4 shows a perspective view of an arm for a multi joint robot according to one embodiment of the present disclosure.

With reference to FIGS. 3 and 4, an arm 101 for a multi joint robot may be formed by a first half portion 301 and a second half portion 302 engaged with each other, an upper portions of the first and second half portions 301, 302 are provided with protrusions 105 and 106 respectively, the protrusions 105 and 106 are substantially parallel to each other. The protrusions 105 and 106 may form a U shape.

A lower portion of the first half portion 301 may be provided with a complete supporting member 103, i.e., the supporting member 103 is entirely located at the lower portion of the first half portion 301. This can guarantee the supporting member 103 being completely cast. The supporting member 103 may be provided with a hollow cylindrical shape or other hollow shape, illustrated in FIGS. 4-6 with an opening 305 extending entirely through the supporting member from one side of the arm 101 to the other side of the arm 101.

The two half portions may be engaged with each other via an engagement surface 303, which may be between the two protrusions 105 and 106. Here and below, the engagement surface refers to a surface where the two half portions 301 and 302, when being engaged, come into contact with each other or are close to each other; the two half portions 301 and 302 may be in full contact or with some clearance, and the surface may be a flat surface or a curved surface.

Figure 5:
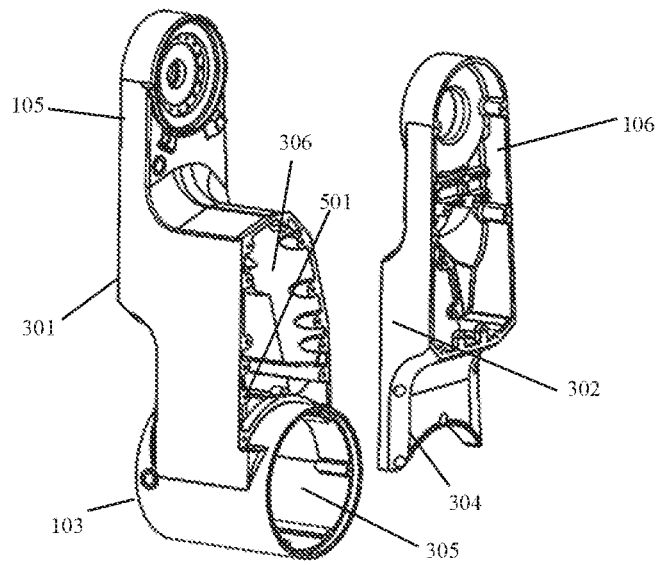
FIG. 5 shows a perspective view of two half portions of an arm for a multi joint robot according to one embodiment of the present disclosure.

According to one embodiment of the present disclosure, the engagement surface 303 may be a flat surface which is substantially parallel to the protruding direction of the protrusions 105 and 106 and which is unequally distant to the two protrusions. The protruding direction Y of the protrusions 105 and 106 may be as shown by a dashed arrow in FIG. 3. Volumes of portions of the two half portions obtained as such except the supporting cylinder may be unequal. In this case, as shown in FIG. 5, according to one embodiment of the present disclosure, the supporting cylinder 103 may be entirely located on the larger half portion 301 of the two half portions except the supporting cylinder, which may make the mechanical performance of the supporting cylinder 103 better.

The shape of a lower portion 304 of the second half portion 302 may match the shape of an outer circumference of the supporting member 103. It is noteworthy that the so-called "match the shape of an outer circumference of the supporting member 103" means the shape of the lower portion 304 of the second half portion 302 is only required to guarantee that the first and second half portions 301, 302 will not interface with each other when being engaged, resulting in failure to be combined, rather than requiring the shape of the lower portion 304 of the second half portion 302 to cause the first and second half portions to be entirely connected without any clearance. For example, when the outer circumference of the supporting member 103 is a cylindrical shape, the shape of the lower portion 304 of the second half portion 302 may be an arc surface, a flat surface or other curved surface, so long as the flat surface or other curved surface will not cause the first and second half portions 301, 302 to interface with each other when being engaged, resulting in failure to be combined, even if the first and second half portions 301, 302 are installed in position with a clearance therebetween.

Figure 6:
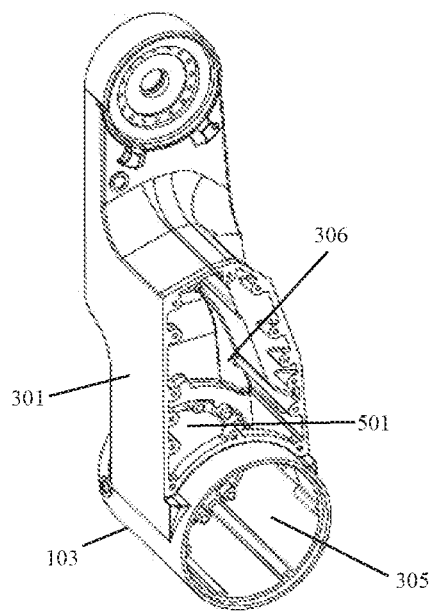
FIG. 6 shows a perspective view of a larger one of two half portions of an arm for a multi-joint robot according to one embodiment of the present disclosure.
Figure 7:
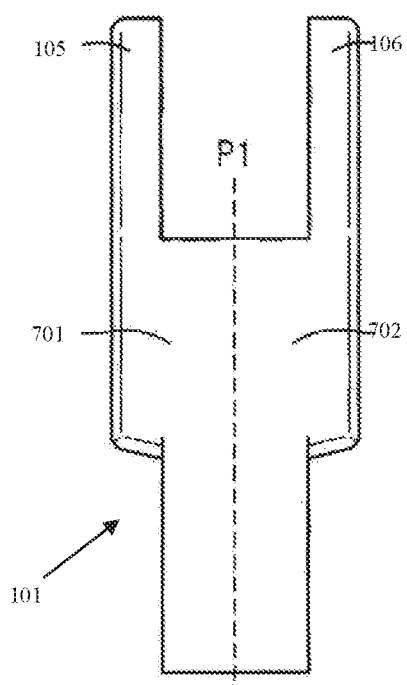
FIG. 7 shows a front view of an existing arm.

The outer circumference of the supporting member 103 on the first half portion 301 obtained by pressure casting is complete. In order to facilitate the passing-through arrangement of devices inside the arm, such as cables, synchronous belts and so on, along a vertical direction of the arm, as shown in FIGS. 5 and 6, after the pressure casting is completed, an upper outer circumference surface of the supporting member 103 is at least partially removed using a processing unit such as a numerical control tool or the like, so as to form a through-hole 501 which enables the cables and synchronous belts to penetrate through the supporting cylinder 103 from the opening 305 therethrough to enter the hollow portion 306 of the first half portion 301. The upper outer circumference surface of the supporting member 103 refers to a portion of an outer circumference surface facing towards the hollow portion 306 of the first half portion 301. As shown in FIG. 5, the hollow portion 306 is located between the protrusions 105, 106 and the supporting member 103 and is enclosed by the first half portion 301 and the second half portion 302.

By virtue of the foregoing features of the two half portions 301 and 302, the arm according to the present disclosure can be obtained through pressure casting, the mechanical performance of the supporting member can be enhanced, and the arm also can be hollowly processed in a convenient manner.

The embodiments of the present disclosure have been illustrated above, but are not intended to limit the present disclosure. Various variations and changes to the present disclosure will be apparent to those skilled in the art. Any modification, equivalent replacement, improvement and so on as made under the spirit and principle of the present disclosure should be included in the scope of the claims of the present disclosure.

We claim:

1. An arm for a multi-joint robot, comprising:
the arm being formed by a first half portion and a second half portion engaged with each other, an upper portion of each of the first and second half portions being provided with a protrusion, the protrusions being substantially parallel to each other, wherein a lower portion of the first half portion is provided with a supporting member, the two half portions being engaged with each other via an engagement surface, the engagement surface being between the two protrusions, a shape of a lower portion of the second half portion matching a shape of an outer circumference of the supporting member;
wherein the supporting member comprises a hollow cylinder extending from one side of the arm to another side of the arm, the hollow cylinder defining an opening extending entirely through the hollow cylinder between the one side of the arm and the another side of the arm.

2. The arm according to claim 1, wherein the engagement surface is a flat surface substantially parallel to a protruding direction of the protrusion and having different distances to the two protrusions.

3. The arm according to claim 2, wherein an upper outer circumference surface of the supporting member is provided with a through-hole.

4. The arm according to claim 1, wherein a volume of a portion of the first half portion excluding the supporting member is larger than a volume of the second half portion.

5. The arm according to claim 4, wherein an upper outer circumference surface of the supporting member is provided with a through-hole.

6. The arm according to claim 1, wherein the first and second half portions are molded by pressure casting.

7. The arm according to claim 6, wherein an upper outer circumference surface of the supporting member is provided with a through-hole.

8. The arm according to claim 1, wherein an upper outer circumference surface of the supporting member is provided with a through-hole.

9. The arm according to claim 1, further comprising a hollow portion disposed between the protrusions and the supporting member and enclosed by the first half portion and the second half portion.

10. The arm according to claim 9, wherein an upper outer circumference surface of the supporting member is provided with a through-hole connecting the opening of the supporting member with the hollow portion.

11. A multi-joint robot, comprising:
an arm formed by a first half portion and a second half portion engaged with each other, an upper portion of each of the first and second half portions including a protrusion, the protrusions being substantially parallel to each other, wherein a lower portion of the first half portion is provided with a supporting member, the two half portions being engaged with each other via an engagement surface, the engagement surface being between the two protrusions, a shape of a lower portion of the second half portion matching a shape of an outer circumference of the supporting member;
wherein the supporting member comprises a hollow cylinder extending from one side of the arm to another side of the arm, the hollow cylinder defining an opening extending entirely through the hollow cylinder between the one side of the arm and the another side of the arm.

12. The robot according to claim 11, wherein the engagement surface is a flat surface substantially parallel to a protruding direction of the protrusion and having different distances to the two protrusions.

13. The robot according to claim 12, wherein an upper outer circumference surface of the supporting member is provided with a through-hole.

14. The robot according to claim 11, wherein a volume of a portion of the first half portion excluding the supporting member is larger than a volume of the second half portion.

15. The robot according to claim 14, wherein an upper outer circumference surface of the supporting member is provided with a through-hole.

16. The robot according to claim 11, wherein the first and second half portions are molded by pressure casting.

17. The robot according to claim 16, wherein an upper outer circumference surface of the supporting member is provided with a through-hole.

18. The robot according to claim 11, wherein an upper outer circumference surface of the supporting member is provided with a through-hole.

19. The robot according to claim 11, further comprising a hollow portion disposed between the protrusions and the supporting member and enclosed by the first half portion and the second half portion.

20. The arm according to claim 19, wherein an upper outer circumference surface of the supporting member is provided with a through-hole connecting the opening of the supporting member with the hollow portion.

* * * * *